(12) United States Patent
Li

(10) Patent No.: US 11,500,572 B2
(45) Date of Patent: Nov. 15, 2022

(54) METHOD OF OPTIMIZING PERFORMANCE OF A DATA STORAGE SYSTEM

(71) Applicant: ALIBABA GROUP HOLDING LIMITED, Grand Cayman (KY)

(72) Inventor: Shu Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 281 days.

(21) Appl. No.: 16/808,163

(22) Filed: Mar. 3, 2020

(65) Prior Publication Data

US 2020/0319816 A1 Oct. 8, 2020

Related U.S. Application Data

(60) Provisional application No. 62/829,011, filed on Apr. 3, 2019.

(51) Int. Cl.
*G06F 3/06* (2006.01)

(52) U.S. Cl.
CPC .......... *G06F 3/0652* (2013.01); *G06F 3/0608* (2013.01); *G06F 3/0659* (2013.01); *G06F 3/0673* (2013.01)

(58) Field of Classification Search
CPC .... G06F 3/0652; G06F 3/0608; G06F 3/0659; G06F 3/0673; G06F 3/0688; G06F 3/0689; G06F 3/0643; G06F 3/061; G06F 3/0638; G06F 3/0679

See application file for complete search history.

(56) References Cited

U.S. PATENT DOCUMENTS 9,165,002 B1 * 10/2015 Lazier .................. G06F 16/162
2013/0232290 A1 * 9/2013 Ish ...................... G06F 12/0246
711/E12.008

\* cited by examiner

*Primary Examiner* — David Yi
*Assistant Examiner* — Alan Otto
(74) *Attorney, Agent, or Firm* — Finnegan, Henderson, Farabow, Garrett & Dunner LLP

(57) ABSTRACT

The present disclosure provides methods, systems, and non-transitory computer readable media for optimizing performance of a data storage system. The methods include receiving an I/O request to write a payload of data; selecting one or more secondary storage units from a plurality of secondary storage units coupled to the data storage system, wherein the selection of the one or more secondary storage units is based on an assessment of one or more effects on the garbage collection activity of the plurality of secondary storage units predicted to result from storing the payload of data on the plurality of secondary storage units; and storing the payload of data on the one or more selected secondary storage units.

25 Claims, 10 Drawing Sheets ary only, and are not restrictive of the invention,
METHOD OF OPTIMIZING PERFORMANCE OF A DATA STORAGE SYSTEM

CROSS-REFERENCE TO RELATED APPLICATION

This disclosure claims the benefit of priority to U.S. Provisional Patent Application No. 62/829,011, filed on Apr. 3, 2019, which is incorporated herein by reference in its entirety.

TECHNICAL FIELD

The present disclosure generally relates to data storage, and more particularly, to methods, systems, and non-transitory computer readable media for optimizing performance of a data storage system.

BACKGROUND

All modern-day computers have some form of secondary storage for long-term storage of data. Traditionally, hard disk drives (HDDs) were used for this purpose, but computer systems are increasingly turning to solid state drives (SSDs) as their secondary storage unit. While offering significant advantages over HDDs, SSDs have several important design characteristics that must be properly managed. In particular, SSDs may perform garbage collection to enable previously written to physical pages to be reused. Garbage collection is resource intensive, however, consuming a significant amount of an SSDs resources, degrading its ability to respond to I/O commands from its attached system. This, in turn reduces system performance and increases system cost.

SUMMARY OF THE DISCLOSURE

The embodiments of the present disclosure provide methods, systems, and non-transitory computer readable media for optimizing performance of a data storage system. The methods include receiving an I/O request to write a payload of data; selecting one or more secondary storage units from a plurality of secondary storage units coupled to the data storage system, wherein the selection of the one or more secondary storage units is based on an assessment of one or more effects on the garbage collection activity of the plurality of secondary storage units predicted to result from storing the payload of data on the plurality of secondary storage units; and storing the payload of data on the one or more selected secondary storage units.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
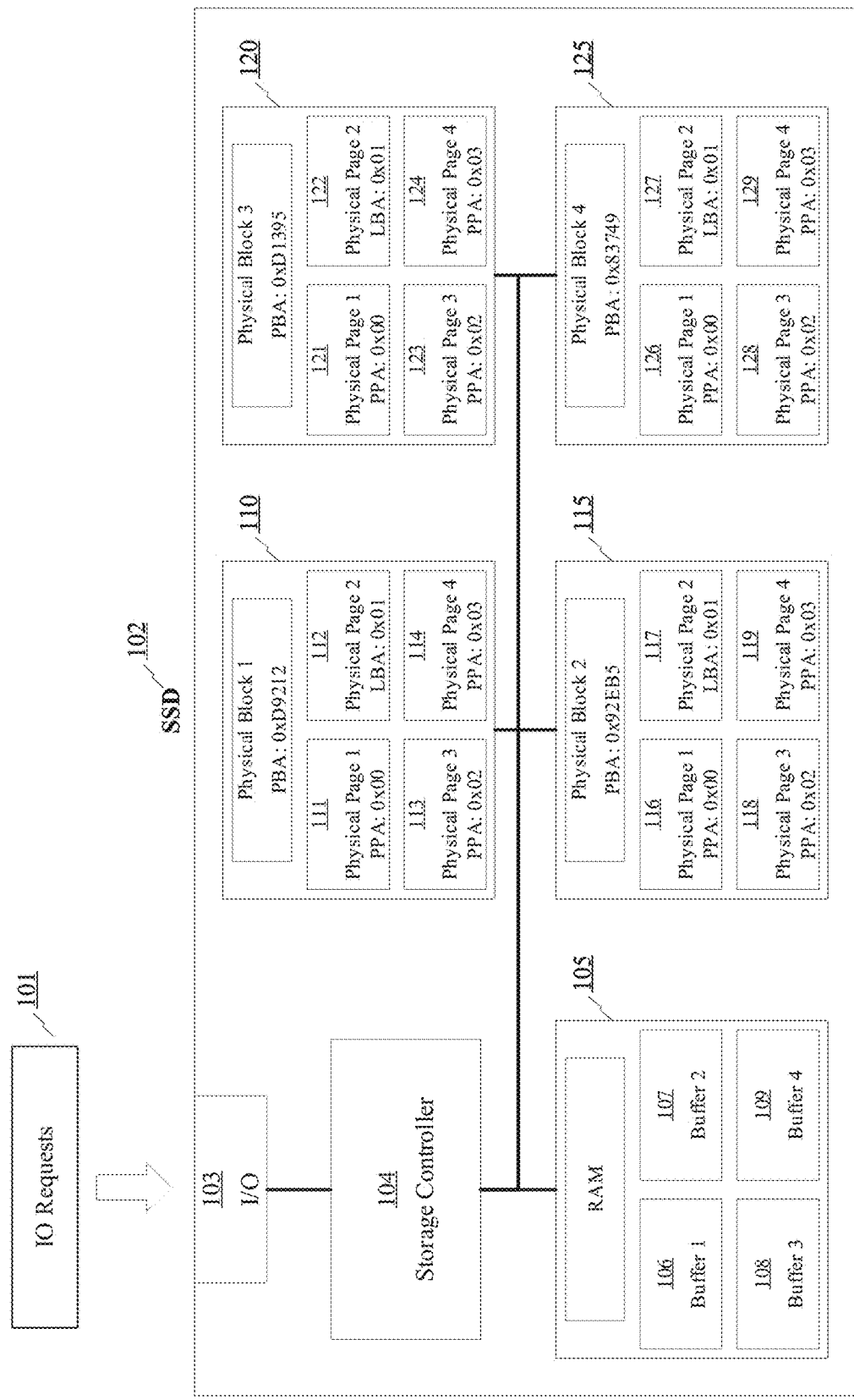
FIG. 1 is a schematic of a simplified internal structure of an SSD, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day computers are based on the Von Neuman architecture. As such, broadly speaking, the main components of a modern-day computer can be conceptualized as two components: something to process data, called a processing unit, and something to store data, called a primary storage unit. The processing unit (e.g., CPU) fetches instructions to be executed and data to be used from the primary storage unit (e.g., RAM), performs the requested calculations, and writes the data back to the primary storage unit. Thus, data is both fetched from and written to the primary storage unit, in some cases after every instruction cycle. This means that the speed at which the processing unit can read from and write to the primary storage unit can be important to system performance. Should the speed be insufficient, moving data back and form becomes a bottleneck on system performance. This bottleneck is called the Von Neumann bottleneck.

Thus, high speed and low latency are factors in choosing an appropriate technology to use in the primary storage unit. Modern day systems typically use DRAM. DRAM can transfer data at dozens of GB/s with latency of only a few nanoseconds. However, in maximizing speed and response time, there can be a tradeoff. DRAM has three drawbacks. DRAM has relatively low density in terms of amount of data stored, in both absolute and relative measures. DRAM has a much lower ratio of data per unit size than other storage technologies and would take up an unwieldy amount of space to meet current data storage needs. DRAM is also significantly more expensive than other storage media on a price per gigabyte basis. Finally, and most importantly, DRAM is volatile, which means it does not retain data if power is lost. Together, these three factors make DRAM not as suitable for long-term storage of data. These same limitations are shared by most other technologies that possess the speeds and latency needed for a primary storage device.

Thus, in addition to having a processing unit and a primary storage unit, modern-day computers also have a secondary storage unit. What differentiates primary and secondary storage is that the processing unit has direct access to data in the primary storage unit, but not the secondary storage unit. Rather, to access data in the secondary storage unit, the data from the second storage unit is first transferred to the primary storage unit. This forms a hierarchy of storage, where data is moved from the secondary storage unit (non-volatile, large capacity, high latency, low bandwidth) to the primary storage unit (volatile, small capacity, low latency, high bandwidth) to make the data available to process. The data is then transferred from the primary storage unit to the processor, perhaps several times, before the data is finally transferred back to the secondary storage unit. Thus, like the link between the processing unit and the primary storage unit, the speed and response time of the link between the primary storage unit and the secondary storage unit assists with system performance. Should its speed and responsiveness prove insufficient, moving data back and forth between the memory unit and secondary storage unit can also become a bottleneck on system performance.

Traditionally, the secondary storage unit in a computer system was HDD. HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's did not face a similar limitation. As the amount of data accessed continued to increase, HDD speeds increasingly became a bottleneck on system performance. This led to the search for and eventually introduction of a new memory storage technology.

The storage technology ultimate chosen was flash memory. Flash storage is composed of circuitry, principally logic gates composed of transistors. Since flash storage stores data via circuitry, flash storage is a solid-state storage technology, a category for storage technology that doesn't have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of SSDs.

SSDs are, in common usage, secondary storage units based on flash technology. Technically referring to any secondary storage unit that doesn't involve mechanically moving components, SSDs are almost exclusively made using flash technology. As such, SSDs do not face the mechanical limitations encountered by HDDs. SSDs have many of the same advantages over HDDs as flash storage such as having significantly higher speeds and much lower latencies. However, SSDs have several special characteristics that can lead to a degradation in system performance if not properly managed. In particular, SSD's must perform a process known as garbage collection before the SSD can overwrite any previously written data. The process of garbage collection can be resource intensive, degrading an SSD's performance.

The need to perform garbage collection is a limitation of the architecture of SSDs. As a basic overview, SSDs are made using floating gate transistors, strung together in strings. Strings are then laid next to each other to form two dimensional matrixes of floating gate transistors, referred to as blocks. Running transverse across the strings of a block (so including a part of every string), is a page. Multiple blocks are then joined together to form a plane, and multiple planes are formed together to form a NAND die of the SSD, which is the part of the SSD that permanently stores data. Blocks and pages are typically conceptualized as the building blocks of an SSD, because pages are the smallest unit of data which can be written to an read from, while blocks are the smallest unit of data that can be erased.

FIG. 1 is a simplified schematic illustrating the basic layout of an SSD. Specifically, FIG. 1 shows how an SSD is composed of an I/O interface 103 through which the SSD communicates to the host system. Connected to the I/O interface 103 is the storage controller 104, which contains processors that control the functionality of the SSD. Storage controller 104 is connected to RAM 105, which contains multiple buffers, shown here as buffers 106, 107, 108, and 109. Storage controller 104 is then shown as being connected to physical blocks 110, 115, 120, and 125. As shown by physical block 110, each physical block has a physical block address (PBA), which uniquely identifies the physical block. Also shown by physical block 110 is that each physical block is made up of physical pages, which, for physical block 110, are physical pages 111, 112, 113, and 114. Each page also has its own physical page address (PPA), which is unique within its block. Together, the physical block address along with the physical page address uniquely identifies a page—analogous to combining a 7-digit phone number with its area code. Omitted from FIG. 1 are planes of blocks. In an actual SSD, a storage controller is connected not to physical blocks, but to planes, each of which is composed of physical blocks.

Figure 2:
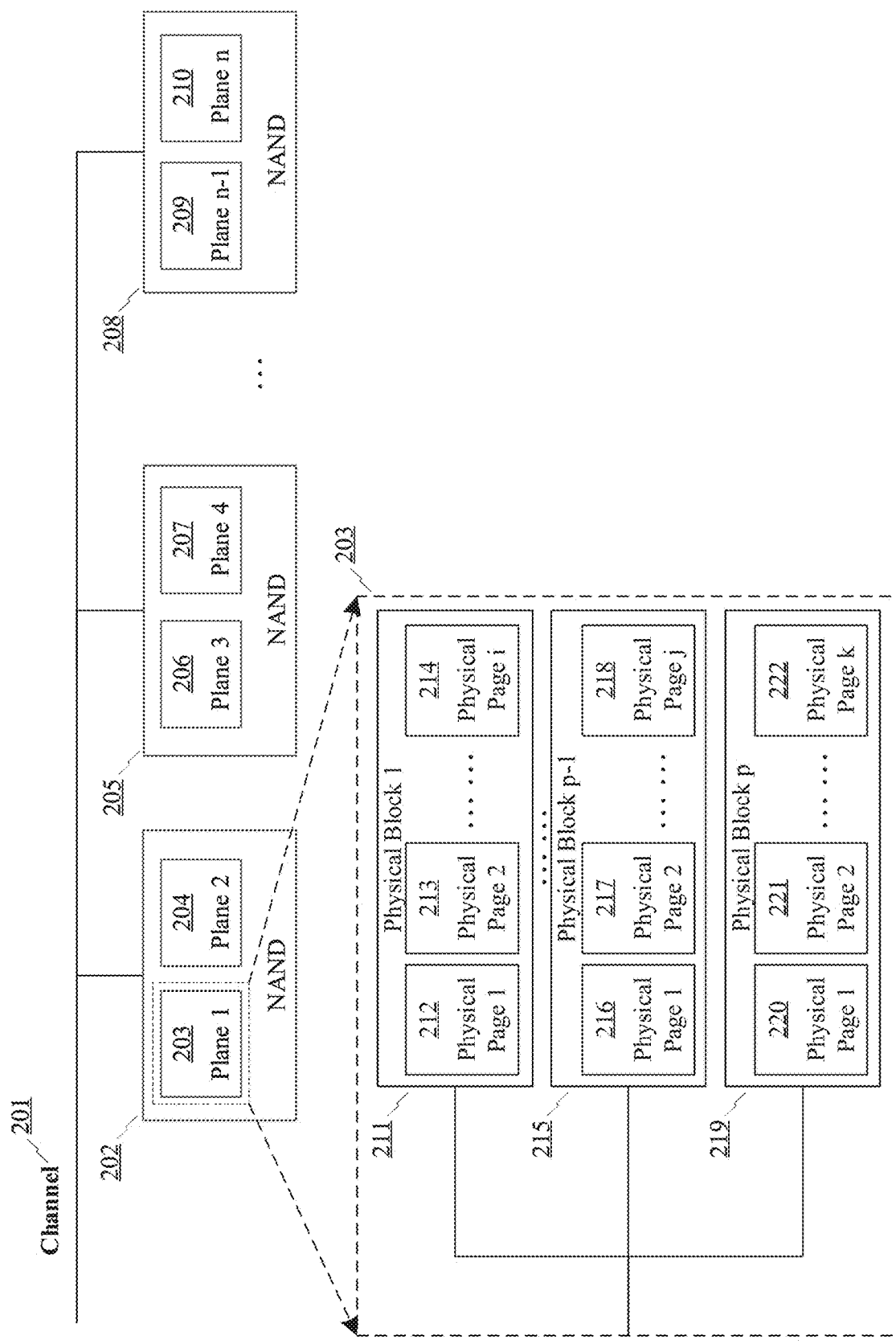
FIG. 2 is a schematic of the basic layout of an example internal structure of a NAND subcomponent of an SSD, according to some embodiments of the present disclosure.

FIG. 2 is an illustration of an exemplary internal NAND flash structure of an SSD. As stated above, a storage controller (e.g., storage controller 104 of FIG. 1) of an SSD is connected with one or more NAND flash integrated circuits (ICs), which is where any data received by the SSD is ultimately stored. Each NAND IC 202, 205, and 208 typically contains one or more planes. Using NAND IC 202 as an example, NAND IC 202 is composed of planes 203 and 204. As stated above, each plane is then composed of multiple physical blocks. For example, plane 203 is composed of physical blocks 211, 215, and 219. Each physical block is then further composed of physical pages, which, for physical block 211, are physical pages 212, 213, and 214.

In operation an SSD typically stores a single bit in a transistor using the voltage level present (high or ground) to indicate a 0 or 1. Some SSDs also store more than one bit in a transistor by using more voltage levels to indicate more values (e.g., 00, 01, 10, and 11 for two bits). Assuming an SSD stores only a single bit for simplicity, an SSD can write a 1 (e.g., can set the voltage of a transistor to high) to a bit in page. An SSD cannot write a zero (e.g., cannot set the voltage of a transistor to low) to a bit in a page. Rather, an SSD can write a zero on a block-level. In other words, to set a bit of a page to zero, an SSD can set every bit of every page within a block to zero. By setting every bit to zero, an SSD ensures that, to write data to a page, the SSD needs to only write a 1 to the bits as dictated by the data to be written, leaving untouched any bits that are to be set to zero (since they are zeroed out and thus already set to zero). This process of setting every bit of every page in a block to zero to accomplish the task of setting the bits of a single page to zero is known as garbage collection, since what typically causes a page to have non-zero entries is that the page is storing data that is no longer valid ("garbage data") and that is to be zeroed out (analogous to garbage being "collected") so that the page can be re-used.

Further complicating the process of garbage collection, however, is that some of the pages inside a block that are to be zeroed out may be storing valid data—in the worst case, all of the pages except the page needing to be garbage collected are storing valid data. Since the SSD must retain valid data, before any of the pages with valid data can be erased, the SSD (usually through its storage controller) must transfer each valid page's data to a new page in a different block. Transferring the data of each valid page in a block is a resource intensive process, as the SSD's storage controller transfers the content of each valid page to a buffer and then transfers content from the buffer into a new page. Only after the process of transferring the data of each valid page is finished may the SSD then zero out the original page (and every other page in the same block). Thus, in general the process of garbage collection involves reading the content of any valid pages in the same block to a buffer, writing the content in the buffer to a new page in a different block, and then zeroing-out every page in the present block.

The impact of garbage collection on an SSD's performance is further compounded by two other limitations imposed by the architecture of SSDs. The first limitation is that only a single page of a block may be read at a time. Only being able to read a single page of a block at a time forces the process of reading and transferring still valid pages to be done sequentially, substantially lengthening the time it takes for garbage collection to finish. The second limitation is that only a single block of a plane may be read at a time. For the entire duration that the SSD is moving these pages—and then zeroing out the block—no other page or block located in the same plane may be accessed.

Because of its severe impact on I/O performance, but necessity to ensure continued functionality of the SSD, the timing of garbage collection is often managed to mitigate its impact. Given the large resource consumption, garbage collection is ideally done during downtime, when there is minimal amount of incoming I/O requests. Since performing garbage collection during downtime means garbage collection is not being performed when most of the SSD's resources are needed to respond to I/O requests, the impact garbage collection has on the SSD's performance is reduced.

However, an SSD can only perform garbage collection when the SSD is aware that the data contained in a page is no longer valid. Without some specialized communication channel, such as a specialized command, the device storing data on the SSD, and not the SSD itself, knows that an event (e.g., when data is modified or deleted) has made stored data invalid. Without a specialized method to inform the SSD that the stored data has become invalid, the SSD only learns that stored data is invalid when the device that stored the data attempts to overwrite the stored data with new data. This information asymmetry can compound and lead to the device (e.g., the file system of an operating system) believing there to be a large amount of unused storage capacity while the SSD believes that most storage capacity is unused. In such a situation, the SSD is likely to learn that numerous strings are invalid during any period of substantial I/O operations, caused by the device reusing (logical) blocks of data that the device knows are available, which the SSD thought were still valid. Having the SSD quickly learn that numerous strings are invalid can to lead to the SSD performing a large amount of garbage collection immediately, which could substantially degrade the SSD's performance. To help alleviate the information mismatch between an SSD and its attached device on what data is valid, a special I/O operation called TRIM was introduced. The TRIM I/O operation allows a device to communicate with the SSD that a particular portion of stored data is no longer valid. The TRIM I/O operation—also known as the TRIM command—allows the SSD to mark the corresponding pages as invalid and better schedule garbage collection.

To understand how TRIM operates, it is useful to understand how a computer system handles and stores data, since how the computer system handles data influences how the TRIM command is used. Generally speaking, modern day computer systems can be thought of as three principle components: the physical components making up the device (hardware), the programs being run on the device (applications), and a special program that manages the hardware and acts as an intermediary for the applications (OS). The primary purpose of the OS is to manage the hardware for the applications, relieving them from needing to know about each other or about the details of the hardware they each are running on. To relieve applications from needing to know about each other or the underlying hardware, the OS abstracts away these details, typically by providing a generic, uniform interface that applications can use, which the OS then transparently maps to the actual physical details as appropriate. One specific way that an OS provides such an abstraction is by providing a file system.

The main function of a file system is to relieve applications from needing to manage the low-level structuring details necessary to properly keep track of data stored on a secondary storage unit. Rather, the file system enables applications to work with logical groupings of data, called files. This view, where data is represented as files, is the logical representation of data, where files are treated as the fundamental unit of data. However, the logical representation is essentially an illusion, as files are not what are actually stored on the secondary storage unit. Rather, the file system converts each file into one or more, usually fixed size, chunks of data called logical blocks. This is the intermediate representation of data. The mapping between a file and the logical blocks is broken down and is maintained in metadata for that file (which itself is stored). To the OS—or the file system subcomponent of the OS—logical blocks are the fundamental unit of data that are acted on and that are stored on the secondary storage unit. Whenever an application requests to read data from or write data to a file, the file system uses the metadata associated with the file to map the read/write operation to the appropriate logical blocks. The file system then sends the data to the secondary storage unit and, if necessary, performs the reverse mapping (data block to file) for any data received in response.

In more complex devices, the file system—which can be a component of a data storage system or data storage engine—performs two mappings: one by the logical file system and one by the logical volume management system—also called the logical volume manager. The logical file system converts each file into one or more chunks of data, called (for clarity) LFS logical blocks. The logical file system also creates and maintains metadata recording which LFS logical block maps to each file, which the logical file system records alongside the files actual data. As before, this metadata typically takes the form of a length and offset uniquely identifying each LFS logical block. This is the logical file system representation of data. From here, the logical file system "writes" the LFS logical blocks to what is known as a logical volume. Though appearing to the logical file system to be a physical secondary storage unit, a logical volume is essentially a virtual secondary storage unit maintained by the logical volume management system. While appearing as a cohesive whole, a logical volume may be spread across numerous physical secondary storage units.

When the logical volume management system receives a request to "write" an LFS logical block, the logical volume manage converts each LFS logical block into one or more chunks of data, called (for clarity) LVM logical blocks. The logical volume management system also creates and maintains metadata recording which LVM logical block maps to each LFS logical block. Like above, this metadata is typically a length and offset uniquely identifying each LFS logical block. This is the logical volume management system (or logical volume manager) representation of data. From here, the logical volume management system (or some other part of the file system) finally writes the LVM logical blocks to the appropriate secondary storage units. The way the LVM typically writes the LVM blocks to is by sending an I/O write request to the appropriate secondary storage unit, with the I/O write request containing the LVM logical block to be written and an identifier for the LVM logical block, such as its length and offset. The reason for this two-stage mapping is that is provides transparent abstraction between a logical container for storing data and the physical devices (i.e., secondary storage units) on which the data is actually stored.

Finally, there is a third mapping that typically occurs on many secondary storage units, especially SSDs. What happens on secondary storage that perform this third mapping is that, after an LVM logical block is received by the unit, the unit performs a second, internal mapping. Specifically, the storage controller of the secondary storage unit, or a subcomponent (called the flash translation layer on SSDs), usually performs a function similar to that described for the file system above. That is, the storage controller converts the incoming LVM logical blocks into chunks of data called physical blocks, which are then stored on the actual, physical hardware of the secondary storage unit. This is the physical representation of data, where physical blocks are treated as the fundamental unit of data. The secondary storage unit maintains metadata recording the mapping between logical blocks and their corresponding physical blocks, which is also stored on the physical hardware. Whenever the file system or OS requests to read from or write to a data block, the secondary storage unit uses the metadata associated with the LVM logical block to map the read/write operation to the appropriate physical blocks.

Figure 3:
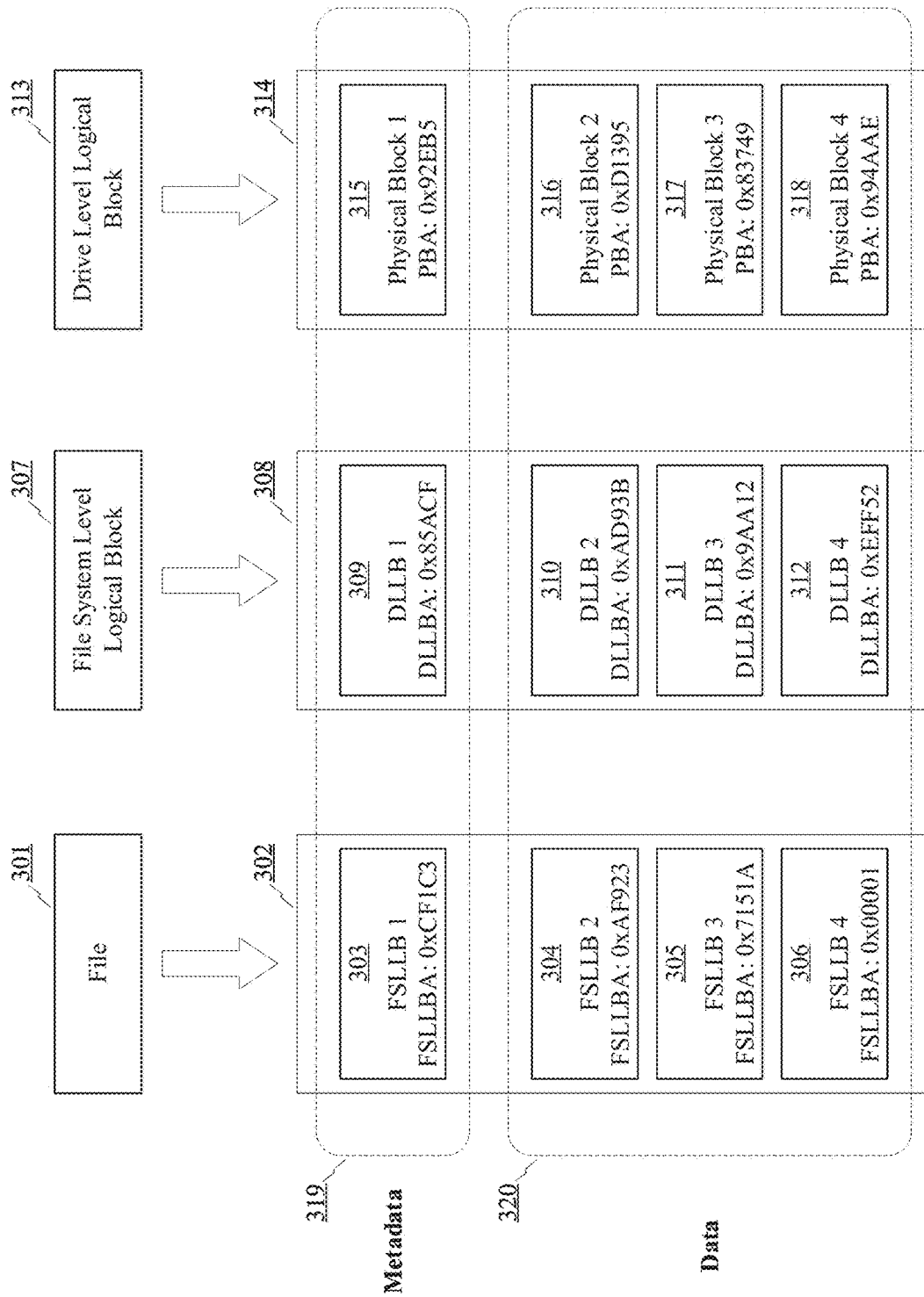
FIG. 3 illustrates and compares the mapping of a file to file system level logical blocks, the mapping of a file system level logical block to drive level logical blocks, and the mapping of a drive level logical block to physical blocks.

FIG. 3 illustrates the similarities between the three mappings performed by a storage system and attached secondary storage units. FIG. 3 shows how a file 301 is mapped to file system level logical blocks (FSLLBs) (shown as 303, 304, 305, and 306) via the logical file system 302. FIG. 3 then shows how a file system level logical block 307 is mapped to drive level logical blocks (DLLBs) (shown as 309, 310, 311, and 312) via the logical volume management system 308 of data storage system. FIG. 3 then shows how a drive level logical block 313 is mapped to physical blocks (shown as 315, 316, 317, and 318) via the storage controller 314 of the secondary storage unit. FIG. 3 also shows how the mapping of a file 301 to file system logical blocks, the mapping of a file system level logical block 307 to drive level logical blocks, and the mapping of a drive level logical block 313 to physical blocks can be broken into data 319 and metadata 320 recording the mapping.

The reasons that secondary storage units, particularly SSDs, perform this third, internal mapping is largely to relieve the device using the SSD from having to know about the particular quirks and specifics of the internal structure and characteristics of the secondary storage unit. Almost every secondary storage unit is designed to present a basic set of primitive operations (such as READ or WRITE) no matter the underlying technology or implementation characteristics. The OS then can utilize the provided generic I/O operations to use the secondary storage unit. The storage controller then handles the details of converting between the generic I/O operations and the specific details of the secondary storage unit's internal physical hardware, including the specifics of the underlying storage technology and any manufacturer specific quirks.

Figure 4:
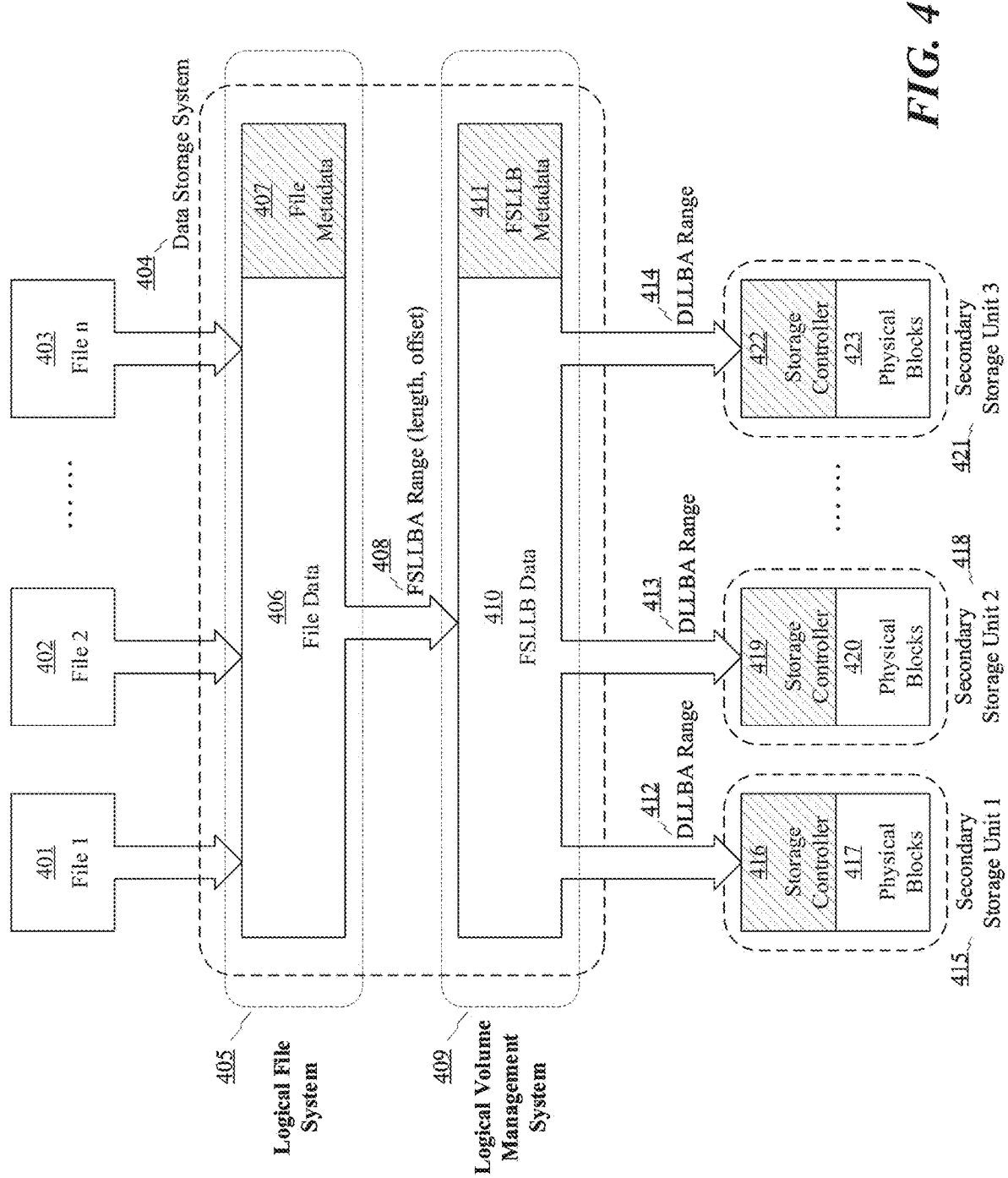
FIG. 4 illustrates a simplified structure of a data storage system and its interactions with applications and secondary storage units, according to some embodiments of the present disclosure.

FIG. 4 is a schematic diagram illustrating a basic overview of the mappings typically performed by a data storage system. According to FIG. 4, files 401, 402, and 403 are mapped by data storage system 404. Using file 401 as an example, file 401 is first mapped by logical file system 405 into file system level logical blocks (FSLLBs) 406 containing the contents of file 401 and into file system level logical blocks 407 containing the metadata recording how file system level logical blocks 406 map to file 401. Next, the file system level logical blocks 406 and 407 are mapped by the logical volume management system 409 of data storage system 404 into drive level logical blocks (DLLBs). Specifically, logical volume management system 409 uses the file system level logical block addresses (FSLLBAs) 408 of file system level logical blocks 406 and 407 to map file system level logical blocks 406 and 407 into drive level logical blocks 410 containing the contents of the file system level logical blocks 406 and 407 and into drive level logical blocks 411 containing the metadata recording how drive level logical blocks 410 map to file system level logical blocks 406 and 407. Next, drive level logical blocks 410 and 411 are sent to secondary storage units 415, 418, and 421 for final storage, using the drive level logical block addresses (DLLBAs) 412, 413, and 414. The storage controllers 416, 419, and 422 of secondary storage units 415, 418, and 421 perform a third mapping from the drive level logical blocks to physical blocks 417, 420, and 423.

Figure 5:
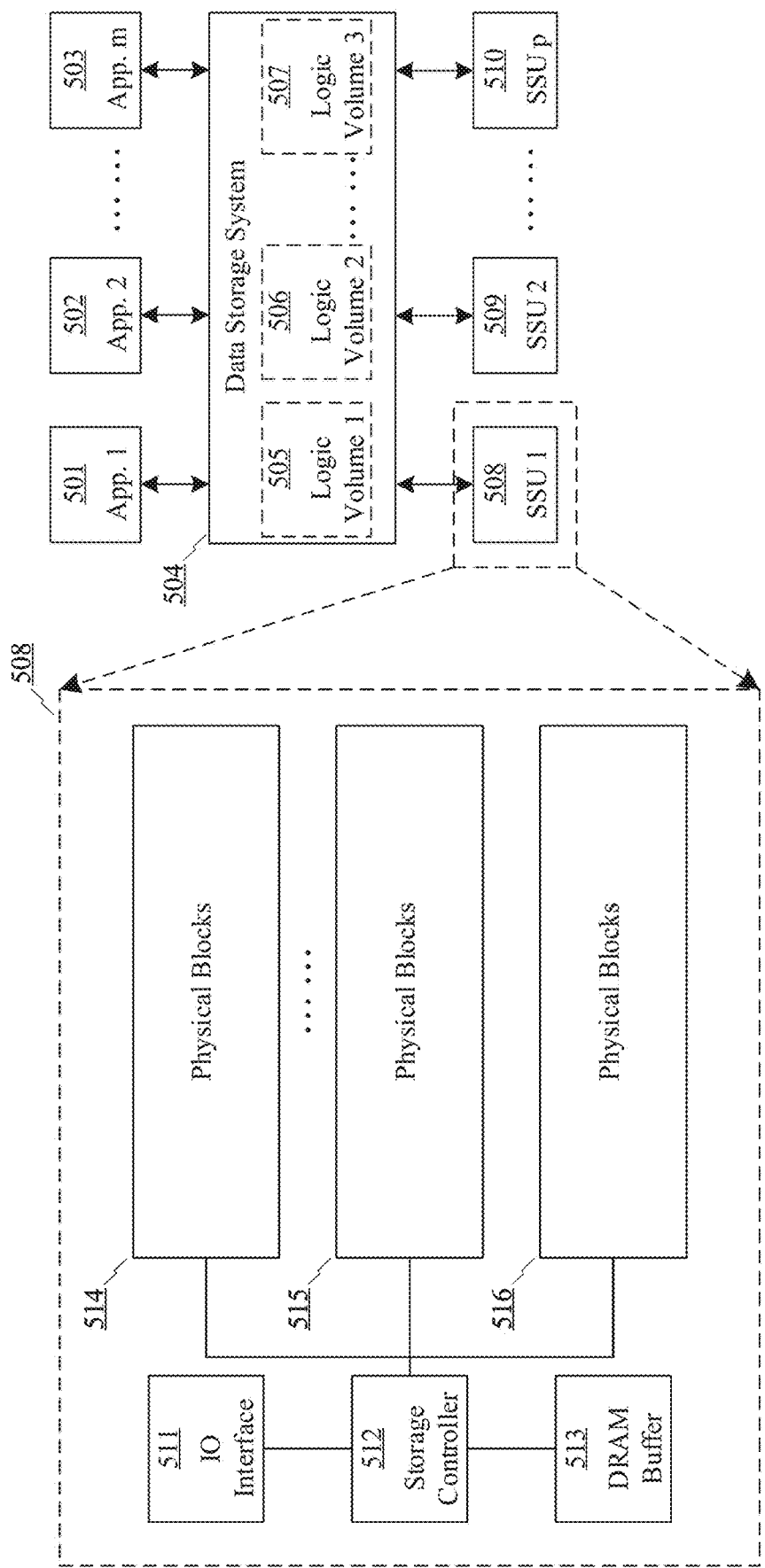
FIG. 5 illustrates an alternative view of a data storage system and shows a simplified view of the internal structure of a generic secondary storage unit, according to some embodiments of the present disclosure.

FIG. 5 is a simplified schematic diagram illustrating a basic overview of a data storage system and attached secondary storage units. As shown in FIG. 5, applications 501, 502, and 503 interact with data storage system 504 to obtain files. Data storage system 504 performs various mappings, with emphasis here on the mapping of logical volumes 505, 506, and 507 to secondary storage units (SSUs) 508, 509, and 510. Each logical volume 505, 506, and 507 may be spread across one or more secondary storage units in a variety of ways. Further shown is a simplified view of the internal layout of a secondary storage unit. Using secondary storage unit 508 as an example, FIG. 5 shows that secondary storage unit 508 is made up of an I/O interface 511, which sends and receives data and I/O request. Connected to I/O interface 511 is storage controller 512, which physically processes incoming I/O requests, reads and writes data from physical blocks 514, 515, and 516, and which can store and retrieve data from DRAM buffer 513. In general, physical blocks 514, 515, and 516 may be based on a variety of technology, such as flash storage, ferromagnetic disks, or tape-based systems.

As mentioned above, an SSD can only perform garbage collection on a string when the SSD knows that the string is invalid. A string is invalid when the data the string is storing is no longer in use by the device. Looking at the data from the logical perspective, a string usually becomes invalid in two cases: when a file is modified and when a file is edited. In either case, the secondary storage unit is unaware the page's the file maps to (or a portion of them) are no longer valid. Rather, the SSD only becomes aware when the device attempts to write an LVM logical block, as identified by its unique identifier such as its length and offset, that the SSD currently has written. In the case of a deleted file, the SSD becomes aware that a page is invalid when the OS reuses one of the deleted file's former and (from the OS's perspective) now unused logical blocks for new data. In the case of a modified file, the SSD becomes aware occurs a page is invalid when the OS attempts to write the logical block with the new, updated data.

However, regardless of whether a logical block is deleted or modified, there is still a large inefficiency. The SSD could usually be informed that a logical block currently stored has invalid data well before that logical block is re-written to the SSD, which is the reason the TRIM command was created. Since the secondary storage unit is not privy to the device's file system, the secondary storage unit has no way of knowing that a file has been deleted, and thus the secondary storage unit has no way of knowing it can perform garbage collection on the corresponding pages that. TRIM alleviates the information asymmetry between a device and coupled (e.g., connected) secondary storage unit by enabling the device to report to the secondary storage unit when a particular file has been deleted or modified. Specifically, the TRIM command allows the device to inform the secondary storage unit that particular LVM logical blocks are no longer valid. The device knows which LVM logical blocks are valid because the device can determine the mapping between a modified or deleted file to the corresponding LFS logical blocks and then to the corresponding LVM logical blocks. Informing the secondary storage unit that particular LVM logical blocks are invalid allows the secondary storage unit to mark the pages corresponding to the LVM logical blocks as being invalid. The secondary storage unit may then perform garbage collection on the pages marked invalid at some time.

Figure 6:
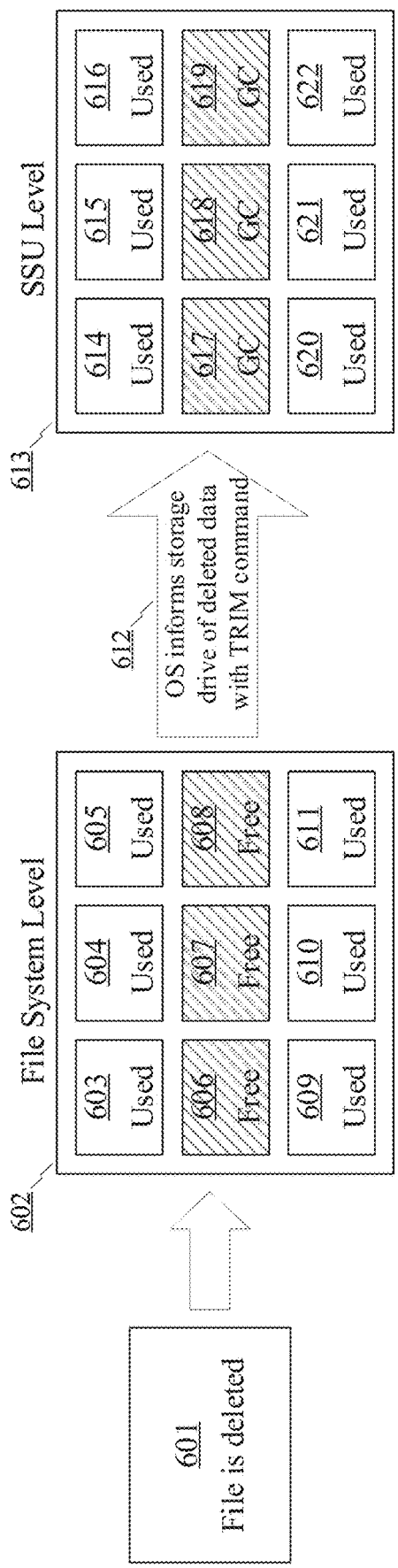
FIG. 6 illustrates a simplified view of the effect and operation of a TRIM command.

FIG. 6 illustrates a simplified view of the effect and operation of a TRIM command. FIG. 6 shows how when a file 601 is deleted, the logical blocks 606, 607, and 608 that file system 602 mapped file 601 to are marked as free (able to be reused for other data). Next, file system 602 (or the OS the file system 602 is a part of) may issue a TRIM command 612 to the secondary storage unit (SSU) 613 that the file system 602 wrote logical blocks 606, 607, and 608 to. After receiving TRIM command 612, secondary storage unit 613 may then perform garbage collection on the physical blocks which secondary storage unit 613 mapped logical blocks 606, 607, and 608 to. Here, logical blocks 606, 607, and 608 were mapped to physical blocks 617, 618, and 619. Note that, in general, file system 602 can write the logical blocks corresponding to file 601 across multiple secondary storage units. Note also that the physical blocks of secondary storage unit 613 are not necessarily the same size as, or have a one-to-one mapping to, the logical blocks of file system 602.

To address these issues, the disclosed embodiments present methods of optimizing performance of a data storage system. The disclosed embodiments reduce and avoid the adverse impact garbage collection has on the I/O performance of a secondary storage unit. In turn, reducing the impact of garbage collection increases I/O speed and capacity, reduces latency, and improves response time of the data storage system.

To enable this optimization, some embodiments of the present disclosure may receive an I/O request to store a payload of data. After the write request is received, some embodiments may select a secondary storage unit to store the payload of data on. The selection may be based on predicting what effects could result from storing the payload of data on the secondary storage units. For example, in some embodiments, one of the effects being predicted could be whether storing the payload of data will trigger a secondary storage unit's garbage collection activity. This may involve making an evaluation of the likelihood that storing the payload of data could trigger any of the plurality of secondary storage units to begin garbage collecting. Evaluating the likelihood that storing a payload of data on a secondary storage unit may cause that secondary storage unit to need to perform garbage collection could involve tracking all valid logical blocks that the data storage system currently has stored. When the data storage system receives a request to overwrite a already stored logical block with a payload of data, the data storage system can evaluate that the secondary storage units currently storing the logical blocks are likely to need to perform garbage collection on the physical pages currently storing the logical block's data. By evaluating whether storing the payload of data is likely to trigger garbage collection, the system may better predict which secondary storage unit the payload of data should be written to.

After a secondary storage unit has been selected, the payload of data may then be written to that secondary storage unit. Typically, writing a payload of data to a secondary storage unit involves writing the payload of data to one or more physical blocks of the secondary storage unit. The process of splitting the payload of data into chunks to be stored on physical blocks may be handled directly by the data storage system or it may be handled by the selected secondary storage unit.

Figure 7:
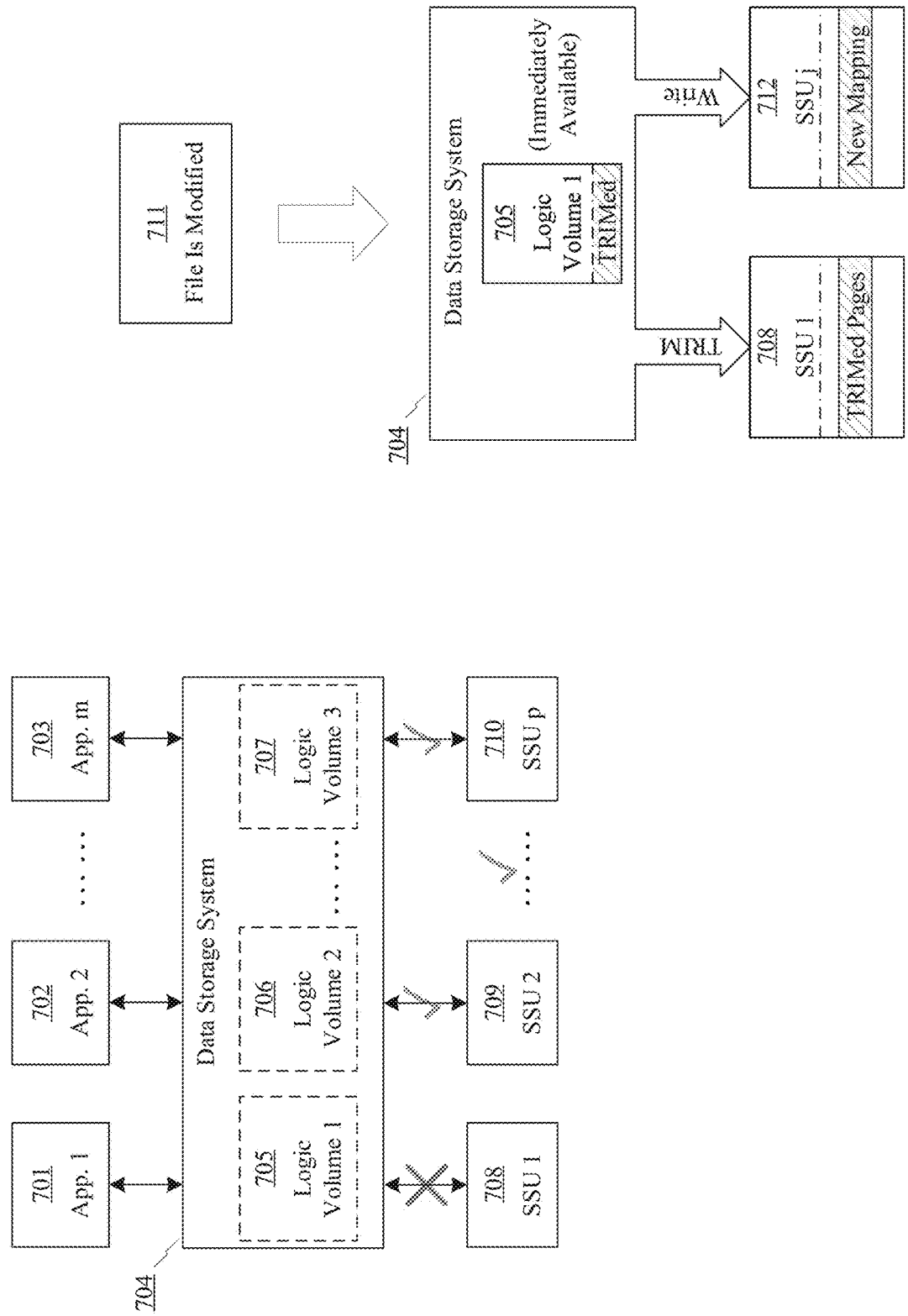
FIG. 7 is a schematic diagram of an exemplary data storage system, according to some embodiments of the present disclosure.

FIG. 7 illustrates a schematic of a system according to some of the embodiments. According to FIG. 7, applications 701, 702, and 703 interact with data storage system 704 to obtain files. Data storage system 704 performs various mappings, with emphasis here on the mapping of logical volumes 705, 706, and 707 to secondary storage units (SSUs) 708, 709, and 710. Each logical volume 705, 706, and 707 may be spread across one or more secondary storage units in a variety of ways. According to some of the embodiments, data storage system 707 may choose to not write data to secondary storage unit 708 when writing data to secondary storage unit would involve overwriting data on secondary storage unit 708. Instead, data storage system 707 may issue a TRIM command to secondary storage unit 708 (as shown by the X) and may instead write the data to another coupled (e.g., connected) secondary storage unit 709 or 710, as shown by the checkmarks (✓).

Also shown in FIG. 7 is another view of how data storage system 704 may write data already written to another secondary storage unit. Specifically, when file 711 is deleted, data storage system 704 may write the new data of file 711 to a different secondary storage unit 712 than its data was previously stored on. Data storage system 704 may ensure the new data of file 711 is written to a different storage unit by changing which secondary storage unit the drive level logical blocks of logical volume 705 that the modified data of file 711 mapped to mapped to. Around the same time, data storage system 704 may issue a trim command to secondary storage unit 708 that previously held the drive level logical blocks of logic volume 705.

In some embodiments, the data storage system may also take into account other criteria in selecting a secondary storage unit, such as the overall number of secondary storage units coupled (e.g., connected) to the data storage system. Some embodiments may also take into account characteristics of the secondary storage units themselves, such as the type of secondary storage units (e.g., HDD vs. SSD), current or historical I/O utilization of the secondary storage units, performance characteristics such the speed of the secondary storage units, or capacity utilization of the secondary storage units.

Some embodiments may select secondary storage units on a different basis than for every payload of data. For example, some embodiments may select to store the next x number of payloads of data on the selected secondary storage unit. Other embodiments may choose to store all payloads of data received with a certain timeframe on the selected secondary storage unit. Some embodiments may choose to store all payloads of data up to a certain amount of data on the selected secondary storage unit. Some embodiments may combine several criteria, such as selecting a storage unit to store the next x number of data payloads received within a certain time and up to a maximum amount of data.

Some embodiments may also consider characteristics of the payload of data, such as if the payload of data is frequently written. One way the characteristics of the payload of data may be used is to ensure that information that is more frequently written to should be stored on a faster secondary storage unit. Doing so could increase the effective speed of the data storage system, increasing its subjective performance to its attached system and ultimately to any end users. Similarly, the data storage system may take into account characteristics of the payload of data to determine the characteristics of any write requests. For example, data that is written to in small, random fragments could be stored on a faster secondary storage unit better able to handle such small write requests. The data storage system may also take into account how often a payload of data is read compared to how often the payload of data is written. If the payload of data is read more often than the payload of data is written, the data storage system may store the payload of data on a secondary storage unit with similarly infrequently read data, to minimize the chance a read request for the payload of data would be interrupted or degraded by any ongoing garbage collection activity.

Some embodiments of the present disclosure may monitor the garbage collection activity of a plurality of secondary storage units. Monitoring the garbage activity of a plurality of secondary storage units may involve, for example, tracking all valid logical blocks that the data storage system currently has stored. Whenever the data storage system overwrites valid logical blocks with new data, the data storage system knows that the secondary storage units storing that logical block is likely to need to perform garbage collection. Other embodiments may track the TRIM commands issued by either the secondary storage unit or the computer system the secondary storage unit is attached to. Still other embodiments may monitor performance metrics of the secondary storage units and use the performance metrics, particularly their degree of difference between their baseline, as a proxy measure for ongoing garbage collection activity. For example, the performance metrics being monitored could include the secondary storage unit's response latency, read or write speeds, or current power draw. Conversely, some embodiments may have direct access to or be directly informed of the secondary storage unit's garbage collecting activity. Ultimately, by monitoring the garbage collection activity, whether directly or indirectly, the data storage system can consider what the secondary storage unit's current/real-time I/O performance is when the data storage system determines how to respond to incoming I/O requests to write data (I/O write requests).

Some embodiments may select a secondary storage unit based on the past or current garbage collection activity of the coupled (e.g., connected) secondary storage units. For example, some embodiments may choose a secondary storage unit that is not currently performing garbage collection or, if all secondary storage units are performing garbage collection, the one that is performing the least amount of garbage collection. Alternatively, some embodiments may involve other metrics in choosing a secondary storage unit. For instance, some embodiments may choose the secondary storage unit that, considering any reductions in performance caused by ongoing garbage collection, has the highest effective write speed. Other embodiments may involve different, more complex schemes that weigh ongoing garbage collection with other information to determine which secondary storage unit is selected.

Some embodiments may segment a data payload into multiple sub-payloads, with each sub-payload subsequently being written to its own secondary storage unit. Some embodiments may determine how many sub-payloads the payload of data is split into based on various characteristics and information about the data storage system, such as the ongoing garbage collection activity of the coupled secondary storage units. Some embodiments may also take into account the characteristics of the secondary storage units coupled to the data storage system, such as the overall number of secondary storage units coupled to the data storage system. The embodiments could also take into account characteristics of the secondary storage units themselves, such as the type of secondary storage units (e.g., HDD vs. SSD), current or historical I/O utilization of the secondary storage units, performance characteristics such the speed of the secondary storage units, or capacity utilization of the secondary storage units.

Some embodiments may also take into account characteristics of the payload of data, such as if the payload of data is frequently written to, if a payload of data is frequently read from, and the specific characteristics of any writes to and reads from the payload of data, particularly by trying to concentrate characteristics true of only a part of the payload with one another in the sub-payloads. For example, some embodiments may attempt to concentrate data that is frequently read but not written to into a sub-payload, enabling the data storage system to more effectively store and handle the data concentrated into the sub-payload without interference from frequent writes to other sub-payload interfering with read requests to the sub-payload. Segmenting the parcel of data into sub-parcels may be done for a variety of reasons. Some embodiments may split the payload of data into sub-parcels for data redundancy, such as in a RAID 1 configuration. Other embodiments may split the parcel of data across multiple units to enable parallel reading and writing across multiple secondary storage units, such as in a RAID 0 configuration.

Some embodiments may split the parcel of data into evenly sized sub-parcels of data. Other embodiments may split the parcel of data into unequally sized sub-parcels of data. Splitting the parcel of data may involve taking into account the various characteristics of the data, characteristics of the data storage system itself, characteristics of the coupled secondary storage units, or whether the parcel of data can be split in such a way as to maximize the concentration of data with given read and write patterns into their own respective sub-parcels.

After segmenting a parcel of data into sub-parcels, some embodiments may then select a secondary storage unit for each sub-parcel to be stored on. Some embodiments may take into account the garbage collection activity of the plurality of coupled secondary storage units when selecting the secondary storage units for the sub-parcels. Some embodiments may also take into account characteristics of the data contained within each sub-parcel, as well as the characteristics of the attached secondary storage units, when selecting each sub-parcel's secondary storage unit.

Some embodiments may additionally select a secondary storage unit to store a payload of data on based on an attempt to minimize the likelihood of future I/O requests—such as requests to overwrite data or TRIM commands—causing garbage collection activity that interferes with I/O requests to read a particular payload of data. As an example, some embodiments may prefer writing frequently overwritten or deleted data to certain secondary storage units, or particular planes in particular secondary storage units, and prefer to write frequently read data to different secondary storage units. Doing so could help reduce the possibility that a secondary storage unit be performing garbage collection that interferes with an incoming read request.

Some embodiments may further take into account the current amount of I/O requests to read data, either on the basis of the data storage system, on a subset of its secondary storage units, or on the basis of individual secondary storage units. Some embodiments may also take into account recent and historical trends, in lieu of or in addition to the current state of. For example, some embodiments may prioritize secondary storage units that are not currently being frequently read from. Other embodiments may attempt to prioritize read requests over write request by delaying write requests, such as by holding the write requests in a buffer. Some embodiments may also more broadly consider the impact of any action on possible write requests, such as evaluating the effect of taking the action, such as issuing a TRIM command, could have on garbage collection, e.g., triggering garbage collection.

Some embodiments may also choose to take special actions with a payload of data that is frequently being read or written to. In some embodiments, the special actions may be based on historical patterns with respect to the system or to the data. In some embodiments, the special action may be based on a recent series of read or write requests to the same data. In some embodiments, taking special action with some payload of data may involve choosing to store the data in a cache or buffer rather than storing the data on a secondary storage unit for some duration, such as until the read or write requests become less frequent. Since storing the data in a cache or buffer avoids writing the data to a secondary storage unit, storing the data in a buffer also avoids frequent reads requiring frequent garbage collection activity. Storing the data in a cache or buffer also speeds up the apparent speed of the data storage system with respect to read requests, since the requested data is immediately available in RAM, which is where data is typically read to from a secondary storage unit before being transmitted to the attached system.

In some embodiments, the coupled secondary storage units may be physically attached to the device, such as through a USB, Thunderbolt, InfiniBand, Fibre Channel, SAS, or SATA connections. In some embodiments, the coupled secondary storage units may not be physically attached to the device but instead are networked, meaning that they are accessible over the device's network connection. Examples include SANs, NASs, cloud storage, and using other device's as remote targets. Some embodiments may have accessible secondary storage units that are of both types, e.g., some secondary storage units may be physically attached, and some secondary storage units may be networked. Some embodiments in particular may only have one attached secondary storage unit but may have access over a network to the secondary storage units attached to other systems.

Figure 8:
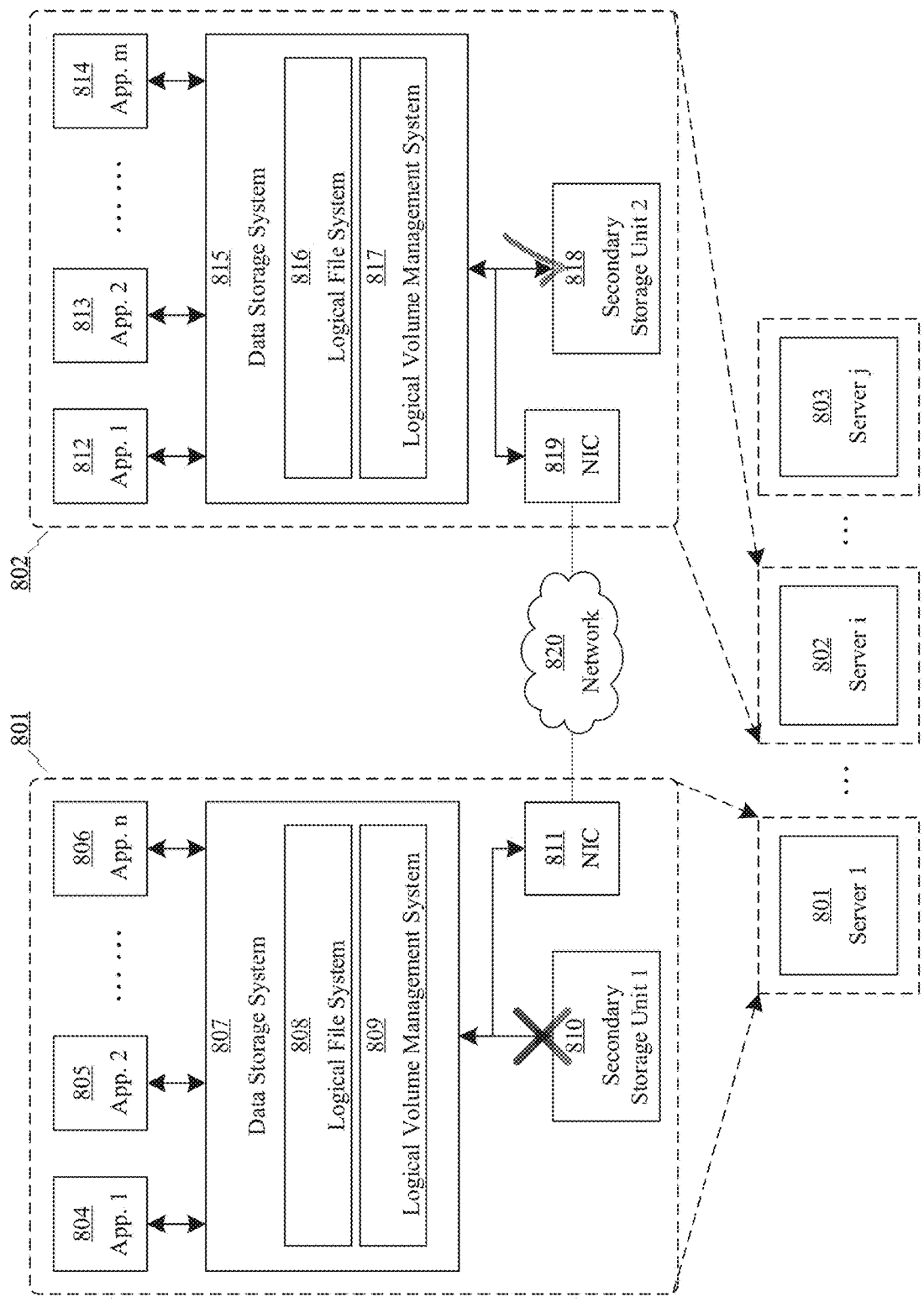
FIG. 8 is an alternative schematic diagram of an exemplary data storage system, according to some embodiments of the present disclosure.

FIG. 8 illustrates a schematic of an exemplary system according to some of the embodiments. Specifically, FIG. 8 illustrates a system using a secondary storage unit not physically coupled (e.g., connected) to the system, but instead accessible over a network connection. According to FIG. 8, servers 801, 802, and 803 are networked with one another. Using server 801 as an example, each server has several applications 804, 805, and 806 interacting with data storage system 807 to obtain files. Data storage system 807 performs various mappings, first with logical file system 808 and then with logical volume management system 809. Data storage system 807 has access to one physically coupled secondary storage unit 810. Data storage system 807 also has access to the secondary storage units of other cooperating servers via server 801's network interface card (CID) over network 820.

According to some of the embodiments, data storage system 807 may choose to not write data to secondary storage unit 810 when data storage system 807 would be overwriting data on secondary storage unit 810. Instead, data storage system 810 may issue a TRIM command to secondary storage unit 810 (as shown by the X) and may instead write the data to the secondary storage unit of a participating sever, here server 802. As shown by the ✓, data storage system 807 may write data to secondary storage unit 818 over network 820.

Figure 9:
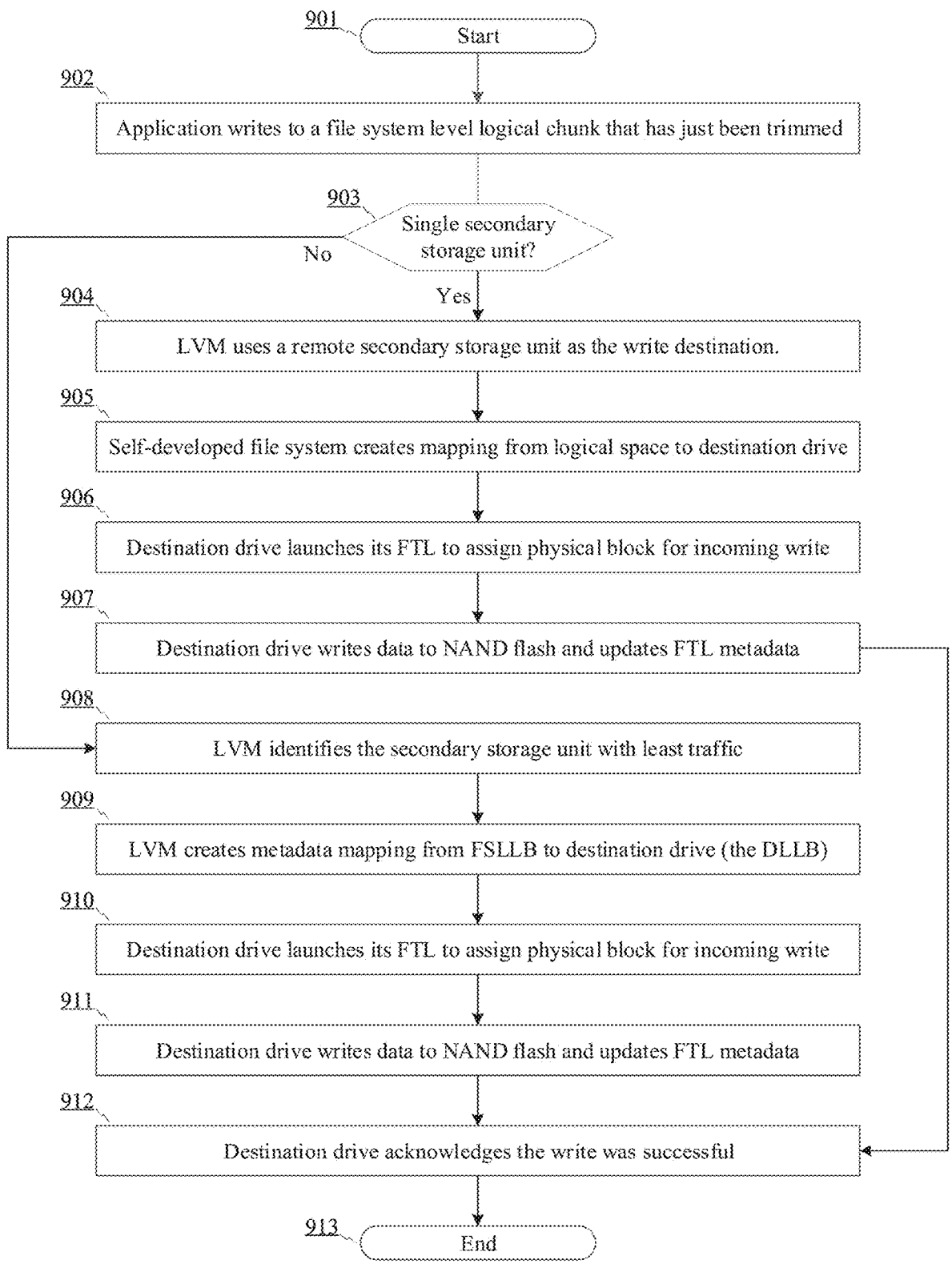
FIG. 9 is a flowchart demonstrating an example method for using a remote secondary storage unit to respond to an I/O request to write a payload of data, according to some embodiments of the present disclosure.

FIG. 9 is a flowchart demonstrating an example method for using a remote secondary storage unit to respond to an I/O request to write a payload of data, according to some embodiments of the present disclosure. The method may be performed by a data storage system (e.g., data storage system 807 of FIG. 8).

As shown by FIG. 9, in the first step 902, an application (e.g., application 804 of FIG. 8) may write to a file having data that ultimately maps down to a file system level logical chunk that is on a secondary storage unit (e.g., secondary storage unit 810 of FIG. 8) that has just been trimmed. Next, in step 903, it is determined whether the data storage system (e.g., data storage system 807 of FIG. 8) has only a single physically coupled secondary storage unit. If in step 903 it is determined that the data storage system does not have only a single physically coupled secondary storage unit, then the method proceeds to step 908.

Alternatively, if in step 903 it is determined that the data storage system does have only a single physically coupled secondary storage unit, then in step 904 the logical volume management system (LVM) (e.g., logical volume management system 809 of FIG. 8) of the data storage system (e.g., data storage system 807 of FIG. 8) instead writes the new data to a remote secondary storage unit (e.g., secondary storage unit 818 of FIG. 8). Then, in step 905, the logical file system (e.g., logical file system 808 of FIG. 8) of the data storage system (e.g., data storage system 807 of FIG. 8) creates a mapping from the logical space of the modified file to the destination drive (the remote secondary storage unit selected as the write destination, e.g., secondary storage unit 818 of FIG. 8). After step 105, in step 906 the destination drive uses its flash translation layer (FTL) to map the incoming (drive level) logical blocks to physical blocks (and physical pages within those physical blocks) in its NAND flash. Next, in step 907, the destination drive writes the logical blocks to the corresponding physical blocks the logical blocks were mapped to and create the appropriate metadata recording the mapping between the stored logical blocks and corresponding physical blocks. From step 907, the method proceeds to step 912.

Alternatively, if in step 903 is determined that the data storage system does not have only a single physically coupled secondary storage unit, then in step 908 the data storage system (e.g., data storage system 404 of FIG. 4) identifies the secondary storage unit with the least traffic (e.g., secondary storage unit 415 of FIG. 4). Then, in step 909, the logical volume management system (e.g., logical volume management system 409 of FIG. 4) creates metadata mapping the logical blocks to the selected destination drive (e.g., secondary storage unit 415 of FIG. 4). After step 909, in step 910 the destination drive (e.g., secondary storage unit 415 of FIG. 4) then uses its flash translation layer (FTL) to map the incoming logical blocks to physical blocks (e.g., a portion of physical blocks 417 of FIG. 4) in its NAND flash. Next, in step 911, the destination drive (e.g., secondary storage unit 415 of FIG. 4) writes the logical blocks to their assigned physical blocks and create the appropriate (FTL) metadata recording the mapping between the logical blocks and physical blocks. From step 911, the method proceeds to step 912. Finally, after the destination drives successfully writes the logical blocks (data) in either step 907 and 911, in step 912 the destination drive (e.g., secondary storage unit 415 of FIG. 4) acknowledges to the data storage system that the write was successful.

Some embodiments may be able to directly control, abort, or schedule garbage collection activity on the coupled secondary storage units. In some embodiments, directly controlling garbage activity may allow delaying garbage collection activity during periods of intense I/O, particularly periods of intense read requests. Some embodiments may attempt to wait until there is system downtime to begin garbage collection, which may be based on either the current/recent pattern of I/O requests of historical trend of I/O requests, such as historically having fewer I/O requests at night or after some particular data access pattern. Some embodiments may measure downtime on the basis of individual secondary storage units, based on either the current/recent patter of I/O requests involving the secondary storage unit or historical patterns in access requests involving the secondary storage unit. Some embodiments may take into account the current capacity of the secondary storage units without garbage collection being performed, the amount of garbage collection needed to be performed, and the likely or actual degradation in performance from delaying garbage collection when deciding if and to what extent to delay the garbage collection of the coupled secondary storage units.

Some embodiments may also perform maintenance operations, particular during downtime or when the utilization of the data storage system or some subset of its coupled secondary storage units is low. One example is dynamically rebalancing data across the secondary storage units. Dynamically rebalancing data across the secondary storage units could be done to accomplish various goals, such as to evenly distribute data across the secondary storage units. Data could also be dynamically rebalanced to group or distribute data with particular access characteristics, such as being read frequently but written infrequently, or vice-versa, together. For example, in some embodiments data could be dynamically rebalanced based on its characteristics by recording historical information about the access trends of particular segments of data.

Some embodiments may also monitor garbage collection activity to optimize the performance of a data storage system in responding to requests to read data. Some embodiments may, for example, determine if the secondary storage unit, which the data requests by the read request is stored on, is currently undergoing garbage collection. If not, the embodiments may simple read the data as normal. If it is determined that the secondary storage unit likely is performing garbage collection, some embodiments may then determine if the garbage collection is being performed in such a way that the garbage collection is likely to interfere with the secondary storage unit's efficiency in responding to the read request. If not, the read request may be issued as normal. If so, however, some embodiments may then halt the garbage collection activity, such as by assigning the read request the highest QoS. The embodiments may then issue the read request as normal, after which the garbage collection may be restarted. Some embodiments may also determine, before halting the garbage collection, if the data that is to be read has happened to be read to a buffer in the garbage collection process. If so, some embodiments may simple read the data from the buffer without interrupting the process of garbage collection.

Figure 10:
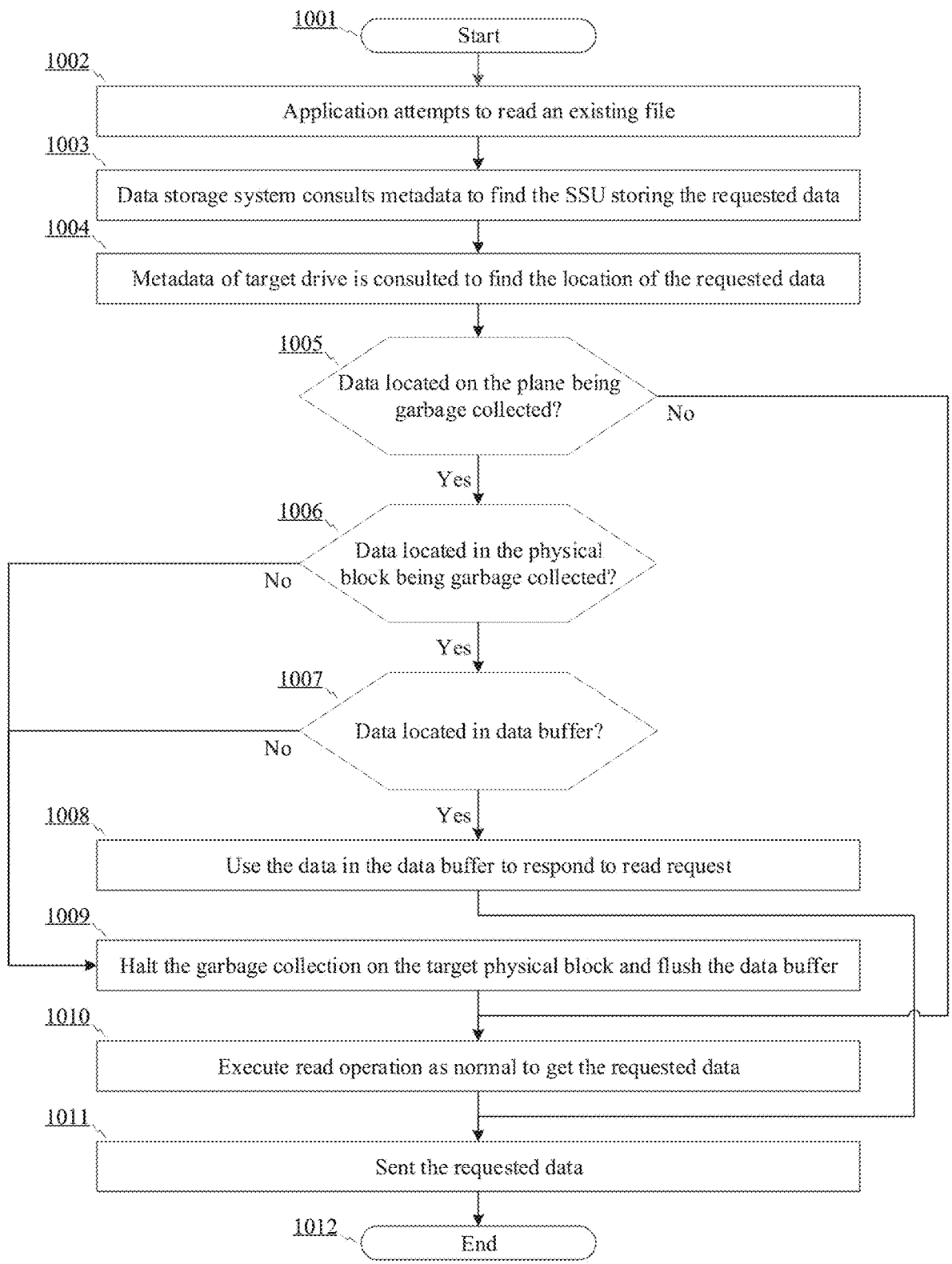
FIG. 10 is a flowchart demonstrating an example method for responding to an I/O request to read a payload of data, according to some embodiments of the present disclosure.

FIG. 10 is a flowchart demonstrating an example method for responding to an I/O request to read a payload of data, according to some embodiments of the present disclosure. The method may be performed by a data storage system (e.g., data storage system 504 of FIG. 5).

As shown by FIG. 10, in the first step 1002, an application (e.g., application 501 of FIG. 5) may attempt to read a file. Next, in step 1003, a data storage system (e.g., data storage system 504 of FIG. 5) may receive the I/O read request corresponding to this attempt to read a file and may consult metadata to determine the secondary storage unit (SSU) (e.g., SSU 508 of FIG. 5) that is storing the data (logical blocks) corresponding to the file. Then, in step 1004, the metadata of the target drive (e.g., SSU 508 of FIG. 5)—the secondary storage unit storing the requested data—is consulted to determine the location of the data on the target drive's NAND flash. This may be accomplished by the flash translation layer (FTL) (e.g., part of storage controller 512 of FIG. 5) of the target drive consulting its metadata to determine the physical blocks (e.g., physical blocks 514 of FIG. 5) that are storing the requested data. Next, in step 1005, it is determined whether the physical block (or blocks) storing the requested data is located on a plane that is being garbage collected. If in step 1005 it is determined that the physical block is not on a plane being garbage collected, the method proceeds to step 1010.

Alternatively, if in step 1005 it is determined that the physical block (or blocks) is on a plane being garbage collected, in step 1006 it is determined whether the physical block (or blocks) storing the requested data is being garbage collected (as opposed to merely being located in a plane where some other physical block is being garbage collected). If in step 1006 it is determined that the physical block is not being garbage collected, the method proceeds to step 1009. Alternatively, if in step 1006 it is determined that the physical block is being garbage collected, in step 1007 it is determined whether the physical block's data has already been read to a data buffer (e.g., DRAM buffer 513 of FIG. 5) (which is also called a page buffer, since it can store one or more pages read from physical blocks). If in step 1007 it is determined that the physical block's data has not been read to a data buffer (e.g., DRAM buffer 513 of FIG. 5), the method proceeds to step 1009. Alternatively, if in step 1007 it is determined that the physical block's data has been read to a data buffer (e.g., DRAM buffer 513 of FIG. 5), then in step 1108 the target drive (e.g., SSU 508 of FIG. 5) uses the data in the data buffer to respond to the read request. After step 1108, the method then proceeds to step 1011.

Alternatively, if steps 1006 or 1007 it is determined that the physical block is not being garbage collected and is not located on a plane being garbage collected, then in step 1009 the garbage collection on the target physical block is halted and the data buffer is flushed. After step 1009, the method then proceeds to step 1010. In step 1010, the target drive (e.g., SSU 508 of FIG. 5) executes the read operation as normal to retrieve the requested data from the physical block (e.g., one of the physical blocks 514 of FIG. 5). After step 1010, the method then proceeds to step 1011. In step 1011, either after the data is read from the data buffer (step 1008) or after the data is read from the physical block normally (step 1010), the data storage system (e.g., data storage system 504 of FIG. 5) sends the read data in response to the I/O request.

Some embodiments may also choose to respond to I/O requests in an order different from the order the requests were received. For example, some embodiments may choose to prioritize read requests over write requests, or to prioritize certain requests based on their more fine-grained characteristics. For example, read requires may be prioritized to avoid likely garbage collection activity from affecting the read request. Some embodiments may also choose to group certain requests together for efficiency reasons, such as being able to write a bigger block of data in one operation or needing to issue fewer I/O commands to the coupled secondary storage units.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, SSD, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The host system, operating system, file system, and other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for optimizing performance of a data storage system, the method comprising:
  receiving an I/O request to write a payload of data;
  selecting one or more secondary storage units from a plurality of secondary storage units coupled to the data storage system, wherein the selection of the one or more secondary storage units is based on an assessment of one or more effects on the garbage collection activity of the plurality of secondary storage units predicted to result from storing the payload of data on one or more secondary storage units of the plurality of secondary storage units, wherein the assessment comprises evaluating a likelihood on whether storing the payload of data on a secondary storage unit would trigger garbage collection for the secondary storage unit; and storing the payload of data on the one or more selected secondary storage units.

2. The method of claim 1, further comprising dividing the received payload of data into two or more sub-payloads of data, and wherein:

selecting the one or more secondary storage units from the plurality of secondary storage units comprises selecting, for each of the two or more sub-payloads of data, one or more secondary storage units from the plurality of secondary storage units;

the assessment of the one or more effects on the garbage collection activity of the plurality of secondary storage units predicted to result from storing the payload of data is based on an assessment of, for each of the two or more sub-payloads of data, one or more effects on the garbage collection activity of the plurality of secondary storage units predicted to result from storing the sub-payload of data on the plurality of secondary storage units; and storing the payload of data on the one or more selected secondary storage units comprises storing each sub-payload of data on the one or more selected secondary storage units that were selected for that sub-payload of data.

3. The method of claim 1, further comprising, responsive to selecting more than one secondary storage unit from the plurality of secondary storage units, dividing the received payload of data into two or more sub-payloads of data, and wherein:

the assessment of the one or more effects on the garbage collection activity of the plurality of secondary storage units predicted to result from storing the payload of data is based on an assessment of one or more characteristics of the payload of data or one or more characteristics of possible sub-payloads the payload of data could be divided into; and storing the payload of data on the one or more selected secondary storage units comprises storing each sub-payload of data on the one or more selected secondary storage units.

4. The method of claim 3, wherein:

each secondary storage unit of the one or more selected secondary storage units is selected for specific sub-payloads of data; and storing each sub-payload of data on the one or more selected secondary storage units comprises storing each sub-payload of data only on the one or more selected secondary storage units that were selected for that sub-payload of data.

5. The method of claim 1, further comprising monitoring the garbage collection activity of the plurality of secondary storage units, and wherein:

selecting the one or more secondary storage units is based on the monitored garbage collection activity of the plurality of secondary storage units; and the assessment of the one or more effects on the garbage collection activity of the plurality of secondary storage units predicted to result from storing the payload of data is based on the monitored garbage collection activity of the plurality of secondary storage units.

6. The method of claim 5, wherein monitoring the garbage collection activity of the plurality of secondary storage units is based on evaluations of:

(1) current or historical I/O burdens of the plurality of secondary storage units;

(2) current or historical I/O queue of the plurality of secondary storage units;

(3) current or historical capacity utilization of the plurality of secondary storage units;

(4) current or historical TRIM command issuance to the plurality of secondary storage units; or (5) current or historical I/O requests to overwrite data stored on the plurality of secondary storage units.

7. The method of claim 1, wherein:

the payload of data is composed of one or more logical blocks; and the assessment of the one or more effects on the garbage collection activity of the plurality of secondary storage units predicted to result from storing the payload of data comprises determining if any of the payload of data's logical blocks are currently stored on the plurality of secondary storage units.

8. The method of claim 7, further comprising issuing a TRIM command to any secondary storage units of the plurality of secondary storage units currently storing the payload of data's logical blocks.

9. The method of claim 8, further comprising updating metadata recording which secondary storage units of the plurality of secondary storage units the payload of data's logical blocks are stored on.

10. The method of claim 1, wherein:

the I/O request to write a payload of data involves overwriting a previous payload of data, wherein the previous payload of data is currently stored on the plurality of secondary storage units; and selecting one or more secondary storage units from the plurality of secondary storage units comprises selecting one or more secondary storage units that that the previous payload of data is not currently stored on.

11. The method of claim 10, further comprising updating metadata recording which secondary storage units of the plurality of secondary storage units the payload of data is stored on.

12. The method of claim 10, further comprising issuing a TRIM command to the secondary storage units the previous payload of data is stored on.

13. A non-transitory computer readable medium that stores a set of instructions that is executable by at least one processor of a computer system to cause the computer system to perform a method for optimizing performance of a data storage system, the method comprising:

receiving an I/O request to write a payload of data;

selecting one or more secondary storage units from a plurality of secondary storage units coupled to the data storage system, wherein the selection of the one or more secondary storage units is based on an assessment of one or more effects on the garbage collection activity of the plurality of secondary storage units predicted to result from storing the payload of data on one or more secondary storage units of the plurality of secondary storage units, wherein the assessment comprises evaluating a likelihood on whether storing the payload of data on a secondary storage unit would trigger garbage collection for the secondary storage unit; and storing the payload of data on the one or more selected secondary storage units.

14. The non-transitory computer readable medium of claim 13, wherein the set of instructions is executable by the at least one processor of the computer system to cause the computer system to further perform dividing the received payload of data into two or more sub-payloads of data, and wherein:
   selecting the one or more secondary storage units from the plurality of secondary storage units comprises selecting, for each of the two or more sub-payloads of data, one or more secondary storage units from the plurality of secondary storage units;
   the assessment of the one or more effects on the garbage collection activity of the plurality of secondary storage units predicted to result from storing the payload of data is based on an assessment of, for each of the two or more sub-payloads of data, one or more effects on the garbage collection activity of the plurality of secondary storage units predicted to result from storing the sub-payload of data on the plurality of secondary storage units; and
   storing the payload of data on the one or more selected secondary storage units comprises storing each sub-payload of data on the one or more selected secondary storage units that were selected for that sub-payload of data.

15. The non-transitory computer readable medium of claim 13, wherein the set of instructions is executable by the at least one processor of the computer system to cause the computer system to further perform, responsive to selecting more than one secondary storage unit from the plurality of secondary storage units, dividing the received payload of data into two or more sub-payloads of data, and wherein:
   the assessment of the one or more effects on the garbage collection activity of the plurality of secondary storage units predicted to result from storing the payload of data is based on an assessment of one or more characteristics of the payload of data or one or more characteristics of possible sub-payloads the payload of data could be divided into; and
   storing the payload of data on the one or more selected secondary storage units comprises storing each sub-payload of data on the one or more selected secondary storage units.

16. The non-transitory computer readable medium of claim 13, wherein the set of instructions is executable by the at least one processor of the computer system to cause the computer system to further perform monitoring the garbage collection activity of the plurality of secondary storage units, and wherein:
   selecting the one or more secondary storage units is based on the monitored garbage collection activity of the plurality of secondary storage units; and
   the assessment of the one or more effects on the garbage collection activity of the plurality of secondary storage units predicted to result from storing the payload of data is based on the monitored garbage collection activity of the plurality of secondary storage units.

17. The non-transitory computer readable medium of claim 13, wherein:
   the payload of data is composed of one or more logical blocks; and
   the assessment of the one or more effects on the garbage collection activity of the plurality of secondary storage units predicted to result from storing the payload of data comprises determining if any of the payload of data's logical blocks are currently stored on the plurality of secondary storage units.

18. The non-transitory computer readable medium of claim 13, wherein:
   the I/O request to write a payload of data involves overwriting a previous payload of data, wherein the previous payload of data is currently stored on the plurality of secondary storage units; and
   selecting one or more secondary storage units from the plurality of secondary storage units comprises selecting one or more secondary storage units that that the previous payload of data is not currently stored on.

19. A system for optimizing data storage, comprising:
   a memory storing a set of instructions;
   one or more processors configured to execute the set of instructions to cause the system to perform:
   receiving an I/O request to write a payload of data;
   selecting one or more secondary storage units from a plurality of secondary storage units coupled to the data storage system, wherein the selection of the one or more secondary storage units is based on an assessment of one or more effects on the garbage collection activity of the plurality of secondary storage units predicted to result from storing the payload of data on one or more secondary storage units of the plurality of secondary storage units, wherein the assessment comprises evaluating a likelihood on whether storing the payload of data on a secondary storage unit would trigger garbage collection for the secondary storage unit; and
   storing the payload of data on the one or more selected secondary storage units.

20. The system of claim 19, wherein the one or more processors are configured to execute the set of instructions to cause the system to further perform dividing the received payload of data into two or more sub-payloads of data, and wherein:
   selecting the one or more secondary storage units from the plurality of secondary storage units comprises selecting, for each of the two or more sub-payloads of data, one or more secondary storage units from the plurality of secondary storage units;
   the assessment of the one or more effects on the garbage collection activity of the plurality of secondary storage units predicted to result from storing the payload of data is based on an assessment of, for each of the two or more sub-payloads of data, one or more effects on the garbage collection activity of the plurality of secondary storage units predicted to result from storing the sub-payload of data on the plurality of secondary storage units; and
   storing the payload of data on the one or more selected secondary storage units comprises storing each sub-payload of data on the one or more selected secondary storage units that were selected for that sub-payload of data.

21. The system of claim 19, wherein the one or more processors are configured to execute the set of instructions to cause the system to further perform, responsive to selecting more than one secondary storage unit from the plurality of secondary storage units, dividing the received payload of data into two or more sub-payloads of data, and wherein:
   the assessment of the one or more effects on the garbage collection activity of the plurality of secondary storage units predicted to result from storing the payload of data is based on an assessment of one or more characteristics of the payload of data or one or more characteristics of possible sub-payloads the payload of data could be divided into; and storing the payload of data on the one or more selected secondary storage units comprises storing each sub-payload of data on the one or more selected secondary storage units.

22. The system of claim 19, wherein the one or more processors are configured to execute the set of instructions to cause the system to further perform monitoring the garbage collection activity of the plurality of secondary storage units, and wherein:

selecting the one or more secondary storage units is based on the monitored garbage collection activity of the plurality of secondary storage units; and the assessment of the one or more effects on the garbage collection activity of the plurality of secondary storage units predicted to result from storing the payload of data is based on the monitored garbage collection activity of the plurality of secondary storage units.

23. The system of claim 19, wherein:

the payload of data is composed of one or more logical blocks; and the assessment of the one or more effects on the garbage collection activity of the plurality of secondary storage units predicted to result from storing the payload of data comprises determining if any of the payload of data's logical blocks are currently stored on the plurality of secondary storage units.

24. The system of claim 19, wherein:

the I/O request to write a payload of data involves overwriting a previous payload of data, wherein the previous payload of data is currently stored on the plurality of secondary storage units; and selecting one or more secondary storage units from the plurality of secondary storage units comprises selecting one or more secondary storage units that that the previous payload of data is not currently stored on.

25. A method for optimizing performance of a data storage system, comprising:

receiving an I/O request to read a payload of data, wherein the payload of data is stored on one or more secondary storage units of a plurality of secondary storage units coupled to the data storage system;

determining, for the one or more secondary storage units that are storing the payload of data, whether to halt any of the garbage collection activity of the one or more secondary storage units, wherein determining whether to halt any of the garbage collection activity of the one or more secondary storage units is based on an assessment of one or more effects on the retrieval of the payload of data predicted to result from the garbage collection activity of the plurality of secondary storage units, wherein the assessment comprises evaluating a likelihood on whether the garbage collection activity would interfere with the one or more secondary storage units efficiency in responding to the I/O request; and retrieving the payload of data from the one or more secondary storage units after the determining.

* * * * *